Oct. 30, 1962 F. P. CIRONE 3,061,682
TRANSISTOR SCANNER NETWORK
Filed Oct. 14, 1959
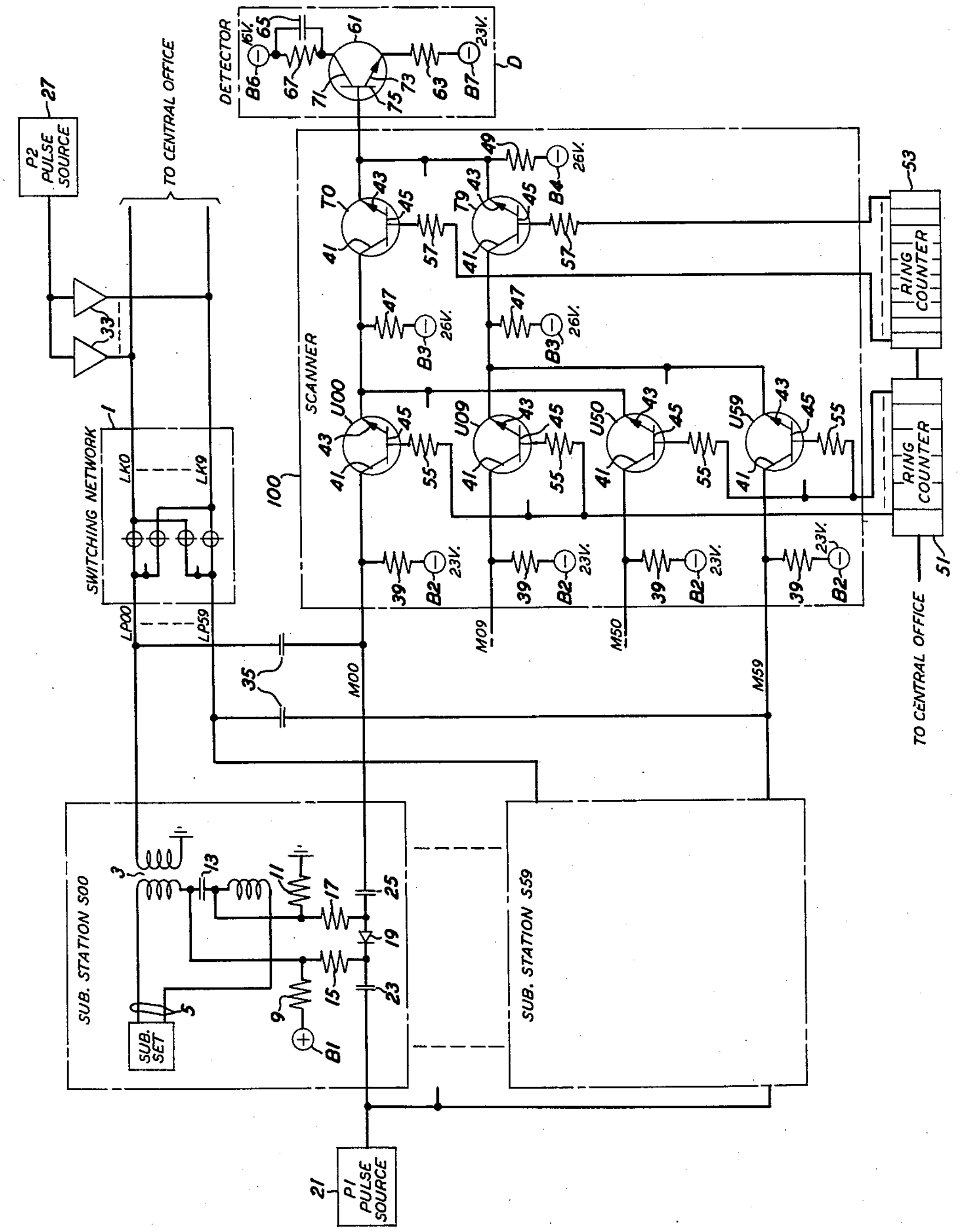
INVENTOR
F. P. CIRONE
BY [signature]
ATTORNEY United States Patent Office 3,061,682

Patented Oct. 30, 1962

3,061,682

TRANSISTOR SCANNER NETWORK

Frank P. Cirone, Dover, N.J., assignor to Bell Telephone Laboratories, Incorporated, New York, N.Y., a corporation of New York Filed Oct. 14, 1959, Ser. No. 846,358
8 Claims. (Cl. 179—15)

This invention relates to scanning or selector circuits and more particularly to such circuits employing transistor devices as the active elements.

Scanner circuits are well known in the art wherein each of a first group of terminals are connected on a time basis to a single terminal along a plurality of distinct channels which are selectively energized therebetween. The usefulness of such a circuit lies in the fact that it may be employed as a distributor circuit for routing information originating at one terminal to one of a group of terminals or, conversely, as a collector circuit for routing information originating at a group of terminals to a single output terminal on a time basis. Selected channels through the scanner circuit are successively energized in response to a control unit which is programmed to provide a desired operation therefor. Scanner circuits find practical application in telemetering systems, computing systems and various types of data processing equipments.

Scanner circuits of the collector type are normally employed in supervisory systems for telemetering or telephone systems wherein a periodic supervision or sampling is desired of the state condition of each of a plurality of monitoring points. In such systems, the monitoring points to be sampled normally appear along or are electrically connected to the metallic conductors along which communication connections are established. Therefore, a basic requirement of all supervisory systems is that a minimum of disturbance be introduced along an energized communication connection at the monitoring point during a sampling thereof.

Supervisory systems employed for a periodic sampling of a group of monitoring points may be classified in one of two classes. Into the first of these classes are classified those supervisory systems wherein a sampling of the monitoring point is continuous only during the unenergized or idle condition of the communication connection along which it appears. Accordingly, the control of the scanner circuit employed in supervisory systems of the first class is programmed such that a monitoring point appearing along an energized communication path is not sampled. The distinguishing feature of those supervisory systems which are classified in the second class is that a sampling of the monitoring point is continuous even during an energized or busy condition of the communication connection along which it appears. A deterrent to the use of supervisory systems of the second class is present as the operation thereof, of necessity, introduces a certain amount of disturbance or noise into a telephone system each time a monitoring point is sampled. Such noise results from a charging or discharging of coupling capacitors which interconnect the scanner circuit to the various monitoring points and, also from a variation in line impedances due to the incorporation of the scanner circuit as an integral part of the over-all telephone system. Of course, the introduction of noise of this type to an unenergized communication connection by supervisory systems classified in either class is not objectionable. However, such noise would appear along an energized communication path as a series of audible blips or clicks having a reoccurrence frequency determined by the rate at which each monitoring point is sampled by the scanner circuit. The sampling rate of each monitoring point is normally sufficiently low so as to be unproductive of an audible tone along an energized communication connection. However, the clicks are objectionable as they do create some annoyance to the subscriber.

A general object of this invention is to provide a bidirectional scanner circuit capable of operation as both a distributor-type and collector-type network.

An object of this invention is to provide a scanner circuit of the collector type for continuously sampling a monitoring point appearing on an energized communication connection with a minimum disturbance thereto.

Another object of this invention is to provide an improved scanner circuit which utilizes transistors for the active elements.

A further object of this invention is to provide a scanner circuit wherein signals appearing at an input terminal may be transmitted through the scanner circuit on either an alternating-current or direct-current basis.

A still further object of this invention is to provide a scanner circuit which operates with relatively low power consumption as compared with other known types.

Still another object of this invention is to provide a scanner or selector circuit having a high degree of flexibility and which may be conveniently incorporated into existing or known systems and specifically into systems requiring scanning of busy telephone lines.

Still another object of this invention is to provide a gating circuit which will not affect the electrical system connected to its input terminal.

The foregoing and other objects of this invention are attained by providing a scanner circuit comprising a plurality of transistor elements connected to bias sources so arranged that the voltage level appearing at the output terminal of the scanner circuit approximates the quiescent voltage level appearing at an input terminal when a path or channel through the scanner is energized, whereby the voltage drop along the energized channel is approximately zero.

According to one specific illustrative embodiment of this invention, information originating at a plurality of monitoring points is continuously sampled and directed on a time basis to the single output terminal of a scanner. To each of the plurality of monitoring points is connected the input terminal of one of a plurality of transistor devices which may be advantageously divided into groups. The output electrodes of corresponding ones of the transistor elements comprising each group are multipled to the input electrode of a common transistor element; the output electrodes of the common transistor elements being multipled to the single output terminal of the scanner. The word "multipled" is used to designate a multiple connection, and is used throughout where a plurality of electrodes is connected to a single terminal. Accordingly, the transistor elements which comprise the scanner are arranged in a pyramid or tree arrangement whereby information appearing at a particular monitoring point may be directed along a selectively energized channel to the single output terminal of the scanner.

A channel is energized through the scanner upon the selective enablement of both the particular transistor element having the input terminal thereof connected to the monitoring point and the common transistor element having the input terminal thereof connected to the output terminal of the particular transistor element. Each transistor element connected to a monitoring point is biased such that, upon an enabling thereof by a control unit connected thereto at the control or base electrode, the voltage level appearing at the output electrode approaches the quiescent voltage level appearing at the input electrode so that total output current is directed through the base or control electrode and substantially none is contributed from the input electrode to be reflected as a disturbance at the monitoring point. The output electrode voltage of the enabled transistor element thus developed is directed as the input voltage to the common transistor element connected thereto. Similarly, the common transistor element is biased such that an enabling thereof results in the output electrode voltage approximating the input electrode voltage thereof, i.e., the output voltage of the first-mentioned enabled transistor element. Accordingly, a channel is selectively energized through the scanner upon the enabling of predetermined transistor elements having respective input-output circuits tandemly arranged and so adapted that the output electrode voltage of each transistor element approximates the input electrode voltage thereof. As the voltage appearing at each input terminal of the scanner upon a channel having been energized therethrough approximates the voltage appearing at the single output terminal, the quiescent voltage level of the monitoring point is maintained substantially constant during each sampling thereof. However, a change in voltage level at the input electrode of a transistor element due to the appearance of a monitoring signal at the monitoring point connected thereto affects the biasing of each tandemly arranged transistor element in the energized channel to initiate current flow therealong whereby the monitoring signal is directed to the single output terminal of the scanner.

A feature of my invention relates to the provision of biasing means for a transistor switch device whereby the output electrode voltage approximates the input electrode voltage upon an enabling thereof.

Another feature of my invention relates to the provision of a plurality of transistor devices tandemly arranged between a first terminal and a second terminal which are operative in an enabled condition to provide a voltage drop of substantially zero therebetween.

Still another feature of my invention relates to the provision of a plurality of transistor elements arranged in a pyramid arrangement for selectively providing a connection channel between a plurality of terminals and a common terminal.

A further feature of my invention relates to the connection of a resistance to the base of each transistor and a resistance to the emitter of each transistor together with an emitter bias and a base enabling pulse such that, on flow of base-emitter current, the voltage divider defined by the series connected base and emitter resistances maintains the emitter voltage at substantially the value of the collector voltage, thereby preventing flow of collector-emitter current.

A still further feature of my invention is a resistance connected to the collector electrode of each of the first stage transistors, and thus to the scanner input terminals, which resistance is of a substantially smaller value than the resistance connected to the emitter electrode whereby transient pulses on initial enablement of the transistor are appreciably swamped by the collector resistance.

Other objects and advantages of my invention will become apparent from a consideration of the following detailed description in conjunction with the single figure which shows an illustrative embodiment of the invention employed as a collector-type scanner to provide a sampling function in the supervisory system of an alternating-current coupled line concentrator telephone system.

The illustrative embodiment of my invention as particularly disclosed may be advantageously employed in connection with supervisory systems of the type disclosed in the F. P. Cirone et al. patent application Serial No. 824,294 filed July 1, 1959. The supervisory system, as shown in the above-cited patent application, provides for the transmission of supervisory information to a central office location from a remotely located line concentrator unit in the form of change condition information as distinguished from state condition information. Such a supervisory system effectively provides for the continuous generation of a first and second series of superaudible pulses which are time displaced with respect to each other and directed oppositely between the loop terminals and the link terminals, respectively, of the switching network of the remote concentrator unit. Scanners are provided for sampling the appearances and absences of each of the first and second series of pulses at each of the loop terminals and the first series of pulses at each of the link terminals of the switching network. Logic means are further provided at the remote location and are operative in conjunction with the loop sampling and link sampling means upon the initial absences or appearances of the first and second series of pulses to generate information pulses indicative of the change condition of a particular substation and also the crosspoint connection in the switching network through which service is to be provided.

While the illustrative embodiment of my invention is particularly directed to such application, it is to be understood that such direction is in no way meant to limit the scope of my invention.

Referring now to the single illustrative embodiment of my invention depicted in the drawing, a group of substations S00 through S59 are shown to which communication connections may be selectively provided from a central office location through the agency of the switching network 1 of a line concentrator unit as controlled by the central office location. As the manner in which the switching network 1 is controlled by the central office location does not constitute a part of my invention and numerous examples of apparatus for affecting such control are known in the art, I have shown the switching network 1 in skeletonized form to depict only the loop terminals LP00 through LP59 and the link terminals LK0 through LK9 thereof in order to simplify and particularly direct the description of my invention. Briefly, a communication connection is energized between a particular one of the substations, e.g., S00, and the central office location, not shown, from the secondary of the repeating coil or transformer 3, the dual primary of which is connected to the subset thereof through a pair of wires 5, through a preselected crosspoint connection in the switching network 1 established under the control of the central office location, through one of the links LK0 through LK9 which emanates from the central office location and are terminated at the switching network 1.

While only the substation S00 is shown in detail, it is to be understood that each of the substations S00 through S59 is provided with identical loop equipment. A battery B1 is connected through a resistor 9 through one primary of the repeating coil 3, through the subset contained at the particular substation along the pair of wires 5 and, therefrom, through the second primary of the repeating coil 3 and the resistor 11 to ground. A capacitor 13 is interposed between the dual primaries of the repeating coil 3 to provide a by-pass of the resistors 9 and 11 of the battery feed circuit for alternating-current signals while avoiding a shunt thereacross for direct-current flow. The subset included in the substations S00 through S59 operates conventionally to present a high impedance to loop current flow when in an on-hook condition and a low impedance thereto when in an off-hook condition.

Connected in parallel across the capacitor 13 is a voltage sensitive transmission gate which is illustrated as comprising a diode 19 which is connected in parallel with the capacitor 13 through the resistors 15 and 17. The diode 19 may preferably be of the type referred to as a Zener diode or a conventional diode in combination with appropriate biasing means and is operative in response to the voltage conditions within the individual substation loop circuits. The voltage conditions within a substation loop circuit are such that during the on-hook condition of a particular substation, e.g., substation S00, there is a low current flow through the loop circuit causing a potential to appear across the capacitor 13 which is sufficient to maintain the diode 19 in a low impedance condition. However, the voltage conditions within the loop circuit of the substation S00 during an off-hook condition results in an increase in current flow therethrough due to the now low impedance presented by the subset thereto and a decrease in the voltage developed across the capacitor 13 which is below the break-down potential of the diode 19.

A source of superaudible pulses 21 is shown multipled through the capacitors 23 to the diode 19 in each of the loop circuits of substations S00 through S59. The diode 19 in each of the loop circuits of substations S00 through S59 is shown electrically connected to the monitoring points or input terminals M00 through M59, respectively, of the scanner 100 through the capacitor 25. Similarly, a source of superaudible pulses 27, which may advantageously be of the same frequency as those pulses developed by the source 21 but time displaced with respect thereto, is multipled to each of the link terminals LK0 through LK9 through individual amplifiers 33 and is connectable to selected ones of the loop terminals LP00 through LP59 upon the closure of a crosspoint connection in the switching network 1 to establish a communication connection between a predetermined one of the substations S00 through S59 and the central office location. As the loop terminals LP00 through LP59 are each connected to the monitoring points M00 through M59, respectively, by individual capacitors 35, the pulse source 27 is electrically connectable to each of the monitoring points or input terminals M00 through M59 of the scanner 100. Accordingly, the scanner 100 is hereinafter described as providing for the sampling of the appearances of the superaudible pulses directed from the sources 21 and 27 at each of the sixty monitoring points M00 through M59, i.e., the junctions of the capacitors 25 and 35. However, it should be understood that the scanner 100 is adaptable to sample on a time basis a lesser or greater plurality of monitoring points without departing from the spirit of my invention.

In the supervisory system as disclosed in the above-cited F. P. Cirone et al. patent application, a continuous sampling of the appearances or absences of the series of pulses generated by the sources 21 and 27 at the loop terminals LP00 through LP59 and of the appearances or absences of the series of pulses generated by the source 21 at the link terminals LK0 through LK9 at the switching network 1 is necessary to provide for the direct determination of the service request change condition of each of the served substations S00 through S59 and the simultaneous monitoring of the switching network 1 with respect to the proper operation of the crosspoint connections corresponding thereto. In the illustrative embodiment of my invention, the scanner 100 is connected to the loop terminals LP00 through LP59 through the coupling capacitor 35 so as to be electrically integral with the line concentrator telephone system. An additional scanner embodying principles of operation similar to those hereinafter described with respect to the scanner 100 may also be employed to sample the appearances of the series of pulses generated by source 21 at the link terminals LK0 through LK9 as required by the supervisory system of the above-cited patent application. As the scanner 100 appears electrically connected with each of the loop terminals LP00 through LP59, noise or disturbance due to a sampling thereby of a particular one of the monitoring points M00 through M59 would be reflected and appear through the line concentrator telephone system. As hereinabove mentioned, such noise or disturbance appearing at a particular one of the loop terminals LP00 through LP59 during such time that a communication connection has not been energized therethrough is not objectionable. However, such noise or disturbance caused by scanners heretofore known in the art during such time in which a communication connection has been energized through a particular loop terminal would appear as an audible click or blip to cause annoyance to a subscriber.

In accordance with my invention, scanner 100 is arranged to provide for a continuous sampling of the appearances or absences of the series of pulses generated by the sources 21 and 27 at each of a plurality of monitoring points M00 through M59 with a minimum noise or disturbance being reflected to and appearing at that one of the loop terminals LP00 through LP59, respectively, with which it is electrically connected. The power contained in such noise or disturbnce is minimized to such a degree as to be sub-audible by providing that the quiescent voltage level at that one of the monitoring points M00 through M59 being sampled by the scanner 100 is maintained at a constant potential during such time as the scanner 100 is conditioned to energize a channel therefrom to a detector device D. The detector device is operative to generate a direct-current indication of the appearance of either or both of the series of pulses.

According to my invention, a plurality of transistor elements U00 through U59 each having a collector electrode 41, emitter electrode 43 and base electrode 45 are each connected at the collector electrode thereof to one of the monitoring points M00 through M59, respectively. A voltage source B2 is connected to each of the monitoring points M00 through M59 through resistors 39 individual therewith. The voltage source B2 provides biasing voltages to the collector 41 of each of the transistor elements U00 through U59 and establishes the quiescent voltage level of the monitoring points to which each is individually connected. Accordingly, each of the resistors 39 is also connected to the coupling capacitors 25 and 35 associated with the monitoring points M00 through M59, respectively, and is operative to normally maintain each in a charged condition. It is evident that while the quiescent voltage level is maintained at a particular one of monitoring points M00 through M59, the capacitor 35 connected thereto serves to isolate the scanner 100 from that one of the loop terminals LP00 through LP59 corresponding thereto. It also follows that the more closely the quiescent voltage level of a monitoring point is maintained during a sampling operation by the scanner 100 the less is the amplitude of the noise or disturbance reflected through the capacitors 35 to appear through the line concentrator telephone systems. As the audibility of a noise pulse along a communication connection is determined by the power contained therein, a minimization of the duration of the noise or disturbance incident to a sampling operation by the scanner 100 coupled with a minimization of variation in the quiescent voltage level at the monitoring point is productive of a noise pulse appearing at the loop terminal connected thereto which is subaudible. The manner in which my circuit assures that only pulses of this type are developed is hereinafter described in detail.

The transistor elements U00 through U59 are advantageously divided into distinct groups to effect a tree or pyramid arrangement whereby the control circuitry may be simplified. The transistor elements U00 through U59 are divided into six groups each comprising ten transistor elements. Each of the six groups may be advantageously referred to as a "tens" group as the counter 51, hereinafter described, operates to selectively enable on a ten-out-of-sixty basis the transistor elements U00 through U59, a final selection of the particular one of the monitoring points M00 through M59 to be sampled being affected by an enabling of one of the transistor elements T0 through T9 by the counter 53, also hereinafter described. Each transistor element U00 through U59 is associated with and corresponds to one of the substations S00 through S59, respectively, due to the connection of the collector electrode 41 thereof through the capacitors 25 and 35 to the diode 19 and a particular one of the loop terminals LP00 through LP59, respectively, which are peculiar to the associated substation. Accordingly, the series of pulses, hereinafter referred to as P1 pulses, generated by source 21 and/or the series of pulses, hereinafter referred to as P2 pulses, generated by the source 27 appear at one of the monitoring points M00 through M59, i.e., at the collector electrode 41 of one of the transistor elements U00 through U59, during that time in which the associated one of the substations S00 through S59 is in an on-hook condition whereby the diode 19 is placed in a low impedance condition and/or a crosspoint connection in the switching network 1 is energized to provide a communication connection to the associated one of the substations.

A "tens" grouping of the transistor elements U00 through U59 is effectively provided by multipling the base electrodes 45 of those transistor elements to be included in each group through individual resistors 55 to a predetermined one of the bistable stages in the ring counter 51 which serves as a common enabling circuit therefor. A further grouping of the transistors U00 through U59 is had by multipling the emitter electrodes 43 of corresponding ones of the transistor elements in each "tens" group to the collector electrode 41 of a selected one of the transistor elements T0 through T9 whereby each of the transistor elements T0 through T9 is connected to one of the transistor elements in each of the six "tens" groups hereinabove described. Each of the base electrodes 45 of the transistor elements T0 through T9 is connected through an individual resistor 57 to a predetermined one of the bistable stages in the ring counter 53 which serves as an individual enabling circuit therefor.

A voltage source B3 is connected to the collector electrode 41 of each of the transistor elements T0 through T9 through the resistors 47 individual therewith to provide biasing voltages therefor and also to the emitter electrodes 43 of the transistor elements U00 through U59 multipled thereto. To provide for the single output terminal for the scanner 100, the emitter electrodes 43 of each of the transistors T0 through T9 are multipled and commonly biased by the voltage source B4 which is connected thereto through the output load resistor 49. The single output terminal of the scanner 100 is connected to the detector device D which is operative to develop a direct-current component of the P1 and/or the P2 pulses directed from a particular one of the monitoring points M00 through M59 along an energized channel through the scanner 100. Accordingly, in the pyramid arrangement of the transistor elements U00 through U59 with the transistor elements T0 through T9, it is to be noted that each of the monitoring points M00 through M59 is electrically connectable to the detector device D through an energizable channel comprising the tandemly arranged or series connected emitter-collector circuits of one of the transistor elements U00 through U59 and one of the transistor elements T0 through T9.

The counters 51 and 53 are cooperative to control the scanner 100 such that an energized channel is provided therethrough to connect each of the monitoring points or input terminals M00 through M59 in a predetermined time sequence to the single output terminal thereof. The ring counter 51 comprises six bistable stages which correspond each to one of the "tens" groups into which the transistor elements U00 through U59 are divided. Similarly, the ring counter 53 comprises ten bistable stages which correspond each to one of the transistor elements T0 through T9. Each of the ring counters 51 and 53 is adapted for a recurrent or cyclic operation and is illustrated as tandemly arranged whereby the ring counter 53 is stepped once for each cyclic operation of the ring counter 51. The ring counter 51 is stepped in response to advance pulses which are received from the central office location, not shown. As many examples are known in the art of electronic ring counter devices having a recurrent or cyclic operation which may be advantageously employed for the practice of my invention, a detailed description of such counters or of the constituent bistable stages thereof is not deemed necessary. It should be noted, however, that the ring counter 53, as it is stepped once for each cyclic operation of the ring counter 51, maintains each of the transistor elements T0 through T9 enabled in turn during a successive enablement of each of the "tens" group into which the transistor elements U00 through U59 are divided. For example, the transistor element T0 is maintained enabled by the first bistable stage in ring counter 53 during that time in which the ring counter 51 successively enables in turn each of the transistor elements having emitter electrodes 43 multipled to the collector electrode 41 thereof, i.e., U00, U10 (not shown), U20 (not shown), U30 (not shown), U40 (not shown), and U50. However, while the scanner 100 is not illustrated as operative to sample the monitoring points M00 through M59 successively in turn, it is evident that any sequence of sampling thereof may be had according to the manner in which the monitoring points M00 through M59 are connected to the collector electrodes 41 of the transistor elements U00 through U59.

In the description of the operation of my novel switching network which follows, exemplary voltages are set forth which can be varied to satisfy peculiar circumstances which may be found in systems into which it is desired to incorporate a scanner in accordance with my invention. For purposes of description, assume a source B2 of minus 23 volts to provide the same quiescent voltage level at each of the monitoring points M00 through M59 and also at the collector electrodes 41 of the transistor elements U00 through U59. Assume, also, a source of B3 of minus 26 volts to provide biasing voltages at each of the emitter electrodes 43 of the transistors U00 through U59 and the collector electrodes 41 of the transistor elements T0 through T9. Further, assume a voltage source B4 of minus 26 volts to provide biasing voltages at the emitter electrodes 43 of each of the transistor elements T0 through T9. Each of the bistable stages in the ring counters 51 and 53 which is connected to the base electrodes 45 of each of the transistor elements U00 through U59 and T0 through T9 supplies an output voltage during a reset condition thereof which is operative to inhibit conduction through the emitter-base circuits of the transistor elements connected thereto as is hereinafter described. As the transistor elements U00 through U59 and T0 through T9 are shown as being of the n-p-n type, the voltage supplied to the base electrodes 45 to provide a reverse biasing of the base emitter circuit thereof must be more negative than the voltage at the emitter multiple electrodes 43 thereof. For purposes of description, assume that the voltage supplied to the base electrode 45 of each transistor device by the bistable stage in the counters 51 and 53 during a reset condition to be minus 26 volts and during a set condition to be minus 16 volts. As a requirement of counters of the type represented by the ring counters 51 and 53 is that one and only one bistable stage contained therein can be in a set condition at any one time, it is evident that the ring counters 51 and 53 cooperate to forward bias the emitter-base junctions of those transistor elements contained in one of the "tens" groups into which the transistor elements U00 through U59 are divided and one of the transistor elements T0 through T9, respectively, at any one time while maintaining the emitter-base junctions of all other transistor elements in the scanner 100 in a nonconducting condition. For example, to sample the monitoring point M00, the counters 51 and 53 operate to provide minus 16 volts enabling voltages to the base electrodes 45 of the transistor elements U00 through U09 comprising one "tens" group and the transistor element T0, respectively. Thereupon a channel is energized between the monitoring point M00 and the single output terminal of the scanner 100 through the tandemly arranged emitter-collector circuits of the transistor elements U00 and T0. It is evident that the energizable channels connecting the remaining ones of the monitoring points M01 through M59 to the single output terminal of the scanner 100 are maintained in an unenergized state at this time as one or both of the transistor elements whose emitter-collector circuits comprise each channel are in a nonconducting condition, as is hereinafter described.

A further understanding of the unique operation of scanner 100 can be obtained by considering the effect upon each of the other monitoring points of the energization of a channel connecting a particular one of monitoring points M00 through M59 to the single output terminal. It is evident that noise or disturbance which appears at a particular one of the monitoring points M00 through M59 during each sampling operation of the scanner 100 is necessarily developed through the transistor elements U00 through U59, respectively, and reflected to the loop terminal LP00 through LP59, respectively, through the capacitors 35. During a sampling of one of the monitoring points M00 through M59 by the scanner 100, one of the four distinct operating conditions is provided to each of the transistor elements U00 through U59. The first of these conditions is that provided to the particular one of the transistor elements U00 through U59 connected to the monitoring point to be sampled during that time in which the "tens" group in which it is contained and that one of the transistor elements T0 through T9 connecting the one transistor to the single output terminal of the scanner 100 are enabled. This is the operating condition provided to the transistor element U00 during a sampling of the monitoring point M00. The second of these conditions is that provided to one of the transistor elements U00 through U59 comprising that "tens" group containing that transistor element connected to the monitoring point to be sampled during that time in which the "tens" group is enabled and that one of the transistor elements T0 through T9 connected thereto is not enabled. This is the operating condition provided to the transistor element U09, for example, during a sampling of the same monitoring point. The third of these conditions is that provided to one of the transistor elements U00 through U59 comprising a "tens" group other than that group containing that transistor element connected to the monitoring point to be sampled during that time in which the other "tens" group is enabled and that one of the transistor elements T0 through T9 connected thereto is enabled. This is the operating condition provided to the transistor element U50, for example, during a sampling of the same monitoring point. The fourth of these operating conditions is that provided to one of the transistor elements U00 through U59 comprising a "tens" group other than that containing that transistor element connected to the monitoring point to be sampled during that time in which another "tens" group is enabled and that one of the transistor elements T0 through T9 is not enabled. This, for example, is the operating condition provided to the transistor element U59 during a sampling of the same monitoring point.

Assume initially that the transistor elements U00 and T0 through which a channel is to be provided between the monitoring point M00 and the single output terminal of the scanner 100 are in a disabled condition. Employing the exemplary voltages set forth above, the transistor element U00 is biased such that the collector electrode 41 is at minus 23 volts (source B2), the emitter electrode 43 is at minus 26 volts (source B3) and the base electrode 45 is at minus 26 volts (the reset output voltage of the bistable stage corresponding thereto in the ring counter 51). Similarly, the transistor element U00 is nonconducting as the collector electrode 41 and the emitter electrode 43 are each biased at minus 26 volts (sources B3 and B4, respectively,) and the base electrode 45 is biased at minus 26 volts (the reset output voltage of the bistable stage corresponding thereto in the ring counter 53). Further, let us now assume that the ring counters 51 and 53 have been stepped along such that the bistable stage in each corresponding to the "tens" group containing the transistor element U00 and to the transistor element T0, respectively, has been placed in a set condition. Accordingly, a minus 16 volt enabling pulse is simultaneously applied through the resistors 55 to the base electrodes 45 of each of the transistor elements U00 through U09 comprising one "tens" group and through the resistor 57 to the base electrode 45 of the transistor element T0 by the counters 51 and 53, respectively. Considering for the moment transistor elements U00 through U09, the application of the minus 16 volt enabling pulse to the base electrodes 45 of each results in the emitter-base junctions thereof being forward biased and, as the respective collector-base junctions are reverse biased, the operation of each initially is as an amplification device.

However, amplifier operation is attributable to each of the transistor elements U00 through U09 only during that time in which the collector-base junctions thereof are in a reverse-biased condition, the duration of which is a function of the rise time of the common enabling pulse applied to the base electrodes 45 thereof; the inherent collector capacity and charging resistances, which are negligible; and the frequency response of the enabled transistor element. The circuit parameters for each of the transistor elements U00 through U09 are selected such that each of the transistor elements enters into a saturated operation, i.e., the collector-base junctions thereof become forward biased, almost immediately upon being enabled by the ring counter 51, as hereinafter described. During the time of amplifier operation, transient pulses resulting from the initial biasing and conduction through the transistor elements U00 through U09 appear at the respective collector electrodes 41 and momentarily disturb the quiescent voltage level thereat. Such transient pulses are developed due to the fact that (1) a finite time is required for each of the transistor elements U00 through U09 to enter into a saturated operation, and (2) a finite time is required for the enabling pulse to traverse from minus 26 volts to minus 16 volts, and (3) a finite time is required to discharge the collector-base equivalent capacitance to the new quiescent value. As fact (3) is small in comparison to facts (1) and (2), the effect thereof upon the operation of the scanner 100 is negligible.

As the amplifier action begins, collector current flows through each of the transistor elements U00 through U09. As the "tens" group comprising the transistor elements U00 through U09 is enabled, the amount of collector current through each transistor element is effectively determined by its respective beta characteristic, i.e., $$\frac{\alpha}{1-\alpha}$$

and is equal to beta times the base current, $i_b$. Therefore, immediately upon the emitter-base junction becoming forward biased and while the collector-base junction is in a reverse-biased condition, there is an initial flow of collector current through each of the transistor elements U00 through U09 from the source B2 and capacitors 25 and 35, through the resistor 39 and the respective emitter-collector circuits, which are now in a high impedance (amplifying) condition, to the source B3 through the resistor 47 across a potential difference of three volts. The resultant change in the voltage appearing at the collector electrode 41 of each of the transistor elements U00 through U09, which is a transient pulse, appears at each of the loop terminals LP00 through LP09 as a noise or disturbance through the capacitor 35. However, the resultant disturbance appearing at the loop terminals LP00 through LP09 is minimized by providing that the resistor 47 be much larger than the resistor 39 whereby the former effects a compensating function. For example, I have found that efficient operation of my novel switching network is had by providing a resistance of 510 ohms for resistor 39 and 24,000 ohms for resistor 47 such that a maximum transient collector voltage excursion of approximately .06 volt is realized. As the base current through each of the transistor elements U00 through U09 increases, the voltage appearing at the respective emitter electrodes 43 increases whereby the potential difference across the respective emitter-collector circuits and the magnitude of the current flow therethrough are reduced.

In accordance with an aspect of my invention, the enabling voltage applied to the base electrode 45, the potential of source B3, i.e., minus 26 volts, and the series voltage divider defined by the base resistor 55, the base-emitter forward voltage drop, and the emitter resistor 47, in the base-emitter circuit, are arranged so that the base-emitter current causes the emitter 43 to assume substantially the quiescent or normal potential of the collector, which, in this embodiment, is minus 23 volts. At the same time, the base is a fraction of a volt more positive, resulting in a saturated transistor. Accordingly, the voltage appearing at each of the respective collector electrodes 41 tends toward this quiescent level, i.e., minus 23 volts.

By providing that the external emitter current is made equal to the external base current and the voltage appearing at the emitter electrode 43 is made equal to the quiescent voltage level of the collector electrode 41, there is realized an operating condition for each of the transistor elements U00 through U09 enabled by counter 51 whereby collector current flow therethrough is inhibited and the respective collector electrodes 41 are maintained at the quiescent voltage level, i.e., minus 23 volts. Such condition is provided for each of the transistor elements U00 through U09 by adjusting the parameters of the above-identified base current path such that each of the transistor elements U00 through U09 enters into a saturated operation wherein the voltage appearing at the respective emitter electrodes 43 approaches and is equal to the voltage appearing at the respective collector electrodes 41, i.e., minus 23 volts. Accordingly, a subsequent unbalancing of the voltages appearing at the collector electrodes 41 and the emitter electrodes 43 of the transistor elements U00 through U09, respectively, results in either positive or negative collector current flow until a quiescent operation is again attained. As the emitter circuit impedance is of much greater magnitude than the collector circuit impedance, a change in the voltage appearing at an emitter electrode 43 results in a relatively small change in the voltage appearing at the collector electrode 41.

In one specific example, I have found such operation may be achieved by providing a resistance of 51,000 ohms for resistor 55 with the suggested resistance of 24,000 ohms for resistor 47, supra, employing 2N560 type silicon transistors.

During the saturated operation of each of the transistor elements U00 through U09, the voltage appearing at the base electrode 45 is a fraction of a volt more positive than that which appears at the collector electrode 41 and emitter electrode 43 due to the voltage drop, e.g., 0.5 volt, which appears across the emitter-base junction thereof. Accordingly, each of the transistor elements U00 through U09 is maintained in a saturated operation during the application at the base electrode 45 thereof of an enabling pulse and collector current therethrough inhibited due to the unbiased condition of the collector-emitter circuit thereof. While the collector-base junction is in a forward-biased condition, minority carriers which are directed from the emitter region into the base region of each of the transistor elements U00 through U09 and diffuse to the collector region thereof are effectively repelled and reinjected into the base region to constitute base current flow. Base-collector current, if present, will flow out of the collector due to minority carriers in the base, and reach the emitter.

Thus, a transient pulse is developed by each of the transistor elements U00 through U09 upon the initiation of emitter current flow therethrough and decreases rapidly with time until the transistor element is fully on or saturated. The turn-on time of the transistor elements U00 through U09 is of the order of one microsecond. Thereupon, the voltage appearing at each of the collector electrodes 41 of each of the transistor elements U00 through U09 again equals the quiescent voltage level as provided by the source B2. As the audibility of the transient pulse which is reflected through the capacitors 35 as a disturbance or noise pulse is a function of the energy contained therein, i.e., the area of such pulse, the relatively fast saturation time of each of the transistor elements U00 through U09 provided by an enabling pulse of fast rise time together with the compensating function provided by the resistor 47 renders noise pulse appearing along an energized communication connection subaudible. It is evident that a decreasing of the rise time of the enabling pulse directed from the ring counter 51 or an increasing of the relative magnitude of resistors 47 and 55 with respect to that of resistor 39 would result in further reducing the energy contained in the transient noise pulse.

It is to be noted that the biasing condition for the transistor element T0 upon the operation of the transistor element U00 is similar to that of each of the transistor elements U00 through U09 prior to the application of the enabling pulses thereto. For example, the collector electrode 41 of the transistor element T0 is maintained at minus 23 volts due to the saturated operation of the transistor element U00, the base electrode 45 thereof is maintained at minus 26 volts by the bistable stage in the ring conductor 51 connected thereto, and the emitter electrode 43 is maintained at minus 26 volts by the source B4 which is connected thereto through the resistor 49. Therefore, upon the application of an enabling pulse at the base electrode 45, the transistor element T0 becomes saturated in a manner similar to that described above with respect to each of the transistor elements U00 through U09 and a transient or noise pulse is developed thereby. By providing circuit parameters to the transistor elements T0, identical to those provided to the transistor elements U00 through U09, i.e., a resistance of 51,000 ohms for the resistor 57 and a resistance of 24,000 ohms for the resistor 49, a subsequent stabilization of the voltages appearing at the collector electrode 41 and emitter electrode 43 at minus 23 volts is had during the saturated operation thereof. The noise pulse developed by the transistor element T0 is, likewise, subaudible. However, as the noise pulses developed upon a simultaneous enabling of the transistor elements U00 and T0 are partially additive due to the effect of the enabling of the latter upon the external emitter circuit of the former, a more desirable operation of the scanner 100 is had by a staggered operation of each "tens" group with respect to its common transistor element T0 through T9, respectively.

Accordingly, there is no external collector current flow through the transistor T0 as the voltage at the emitter electrode 43 of the transisor element U00 is maintained at minus 23 volts and the saturated operation thereof undisturbed. Therefore, by providing in accordance with my invention that the voltage at the single output terminal of the scanner 100, i.e., the emitter electrode 43 of the transistor element T0, be equal to the quiescent voltage level at that one of the monitoring points being sampled, i.e., the collector electrode 41 of the transistor element U00, the potential difference therebetween is zero and no current flows through the tandemly arranged emitter-collector circuits of the transistor elements U00 and T0, each of which is now provided with a saturated operation. Accordingly, there can be no current flow through the collector electrode 41 of the transistor U00 and the quiescent voltage level at the monitoring point is maintained save for the temporary appearance of a subaudible transient pulse.

The sequence in which the transistor elements U00 and T0 are enabled does not materially affect the operation of the scanner 100. As mentioned above, the transistor element T0 is maintained enabled by the ring counter 53 during a successive enabling of each of the "tens" groups into which the transistor elements U00 through U59 are divided. If the operation of the ring counter 51 is such that a delay is introduced between the enabling of successive "tens" groups, the voltage appearing at the collector electrode 41 of the transistor T0 becomes slightly less negative, e.g., approximately minus 24.5 volts, due to conduction therethrough and a reverse biasing of the transistor element U00. Accordingly, each transistor element having an emitter electrode 43 multipled to the collector electrode 41 of the transistor element T0, i.e., U00, U10 (not shown), U20 (not shown), U30 (not shown), U40 (not shown), and U50 remains in a reverse-biased condition until enabled in turn by the ring counter 51, as described above. The enabling of each of the transistor elements U10 (not shown), U20 (not shown), U30 (not shown), U40 (not shown) and U50 is, of course, accompanied by the development of a transient pulse, as described above. However, the power contained within the transient pulse which is developed by each of these transistor elements is somewhat less than that developed by the transistor element U00 due to the less negative biasing potential at the emitter electrodes 43 of the former upon the application of an enabling pulse thereto and the resultant smaller time from turning on to saturation.

If the operation of the ring counter 51 in enabling successive "tens" groups is instantaneous, the voltage appearing at the collector electrode 41 of the transistor element T0 remains at approximately minus 23 volts during the enabling of the next successive "tens" group due to the storage properties of the transistor element comprising the next previously enabled "tens" group which has been returned to a reverse-biased condition by the operation of the ring counter 51. Accordingly, the power contained in the transient pulse developed by each of the transistor elements comprising the next successive "tens" group is still further reduced.

During a saturated operation of the transistor elements U00 and T0 by which an energized channel is provided between the monitoring point M00 and the single output terminal of the scanner 100, the collector-base and emitter-base junctions of each is forward biased. A predetermined variation in either of the voltages appearing at the collector electrode 41 of the transistor element U00, i.e., a positive or negative variation, or emitter electrode 43 of the transistor element T0, i.e., a positive or negative variation, by a pulse directed thereto results in an unbalance of the zero voltage difference existing therebetween and a subsequent biasing of the respective collector-emitter circuit. During such time, current flows through the tandemly arranged emitted-collector circuits of the transistor elements U00 and T0 whereby a pulse may be bi-directionally directed along the energized channel provided therealong and through the scanner 100. Therefore, according to the illustrative embodiment of my invention, on enabling of the diode 19 or the closure of a crosspoint connection in the switching network 1, the series of pulses from either or both of the sources 21 and 27 directed through the capacitors 25 and 35, respectively, to the monitoring point M00 appear at the single output terminal of the scanner 100; these pulses are assumed to have a positive excursion of one volt. The appearances of each of the pulses directed from the sources 21 and 27 create an unbalance in the potential difference which exists between the collector electrode 41 and emitter electrode 43 of the transistor element U00 and attempts to reverse bias the collector-base junction thereof. The external emitter current of the transistor element U00 is thereby increased to provide a resultant increase in the voltage appearing at the emitter electrode 43 of the transistor element U00 and also the collector electrode 41 of the transistor element T0. This increase in the voltage appearing at the collector electrode of the transistor element T0 similarly affects an unbalancing of the potential difference existing between the collector electrode 41 and the emitter electrode 43 of the transistor element T0 and attempts to reverse bias the collector-base junction thereof so that an increased emitter current is caused to flow through the common output resistor 49 to provide an indication of each pulse to the detector D.

The detector D comprises the transistor element 61 which is arranged in an emitter follower configuration to provide a high impedance at the single output terminal of the scanner 100. The output of the scanner 100, i.e., the multipled emitter electrodes 43 of the transistor elements T0 through T9, is connected to the base electrode 75 of the transistor element 61. Appropriate biasing potentials are provided to the collector electrode 71 and the emitter electrode 73 thereof which may be of the order of minus 16 volts and minus 23 volts, respectively, by the sources B6 and B7, respectively. The source B6 is connected to the collector electrode 71 of the transistor element 61 through an RC circuit comprising the resistor 67 and the capacitor 65 which is operative to provide a direct-current component of the pulses directed to the base electrode 75 thereof along an energized channel through the scanner 100. As the detector D operates in a conventional manner, a detailed explanation of the operation thereof is not deemed necessary.

Consider now the effect of the energization of a channel between the monitoring point M00 and the single output terminal of the scanner 100 upon the transistor element U09. As described above, an enabling pulse is simultaneously directed to the base electrodes 45 of the transistor elements U00 through U09 from the bistable stage in the counter 51 which is common thereto. Accordingly, the transistor element U09 is turned on and saturated simultaneously with the transistor element U00 and a transient pulse is developed thereby, as described above. The transient pulse so developed appears at the monitoring point M09 to which the collector electrode 41 of the transistor element U09 is connected and is reflected to the loop terminal LP09 through the capacitor 35. As also described above, the voltage appearing at the emitter electrode 43 of the transistor element U09 which is connected to the collector electrode 41 of the transistor T9 is minus 23 volts. The transistor element T9 is maintained in a reverse-biased condition during a sampling of the monitoring point M00 due to the application at the base electrode 45 thereof of a minus 26 volts potential from the bistable stage in the ring counter 53 connected thereto. Accordingly, the monitoring point M09 is effectively isolated from the single output terminal of the scanner 100 at this time.

Next, consider the effect of the energization of a channel between the monitoring point M00 and the single output terminal of the scanner 100 upon the transistor element U50. During such time as the transistor element U00 through U09 comprising one "tens" group are provided with an enabling potential at the respective base electrodes 45 by the ring counter 51, a minus 26 volt potential is maintained at the base electrodes 45 of the group of transistor elements U50 through U59 comprising another "tens" group. As described above, the emitter electrode 43 of the transistor element U50 is multipled to the collector electrode 41 of the transistor element T0 such that the enabling of either or both of the transistor elements U00 and T0 results in a decrease of potential thereat. This resultant decrease in potential appearing at the emitter electrode 43 of the transistor element U50 is effective to reverse bias the emitter-base junction thereof. Accordingly, the transistor element U50 is maintained in a reverse-biased condition. It is to be noted that the potential at the emitter electrodes 43 and the collector electrodes 41 of the transistor element U50 during a saturated operation of the transistor element U00 are equal, i.e., each is biased minus 23 volts and both the emitter-base and collector-base junctions thereof are reverse biased. Accordingly, the appearance of a series of pulses having a positive excursion of one volt from the source 21 and/or 27 at the monitoring point M50 cannot appear at the collector electrode 41 of the enabled transistor element T0 and, conversely, the noise pulse developed by the transistor element T0 cannot appear at the monitoring point M50 as isolation is effectively provided therebetween by the reverse-biased transistor element U50.

Finally, let us consider the effect of the above-described operation of the scanner 100 in sampling the monitoring point M00 upon the transistor element U59. It is evident that the quiescent condition thereof is maintained. In this case, the transistor element U59 and the transistor element T9 which have emitter electrode 43 and collector electrode 41, respectively, coupled are each in a reverse-biased condition. Accordingly, the monitoring point M59 is effectively isolated from the single output terminal of the scanner 100 and from the remainder of the scanner.

It is evident that transient pulses are developed upon the operation of the scanner 100 in energizing a channel between one of the monitoring points M00 through M59 to be sampled and the single output terminal thereof which are reflected as noise pulses only to those terminals which are connected to an enabled "tens" group into which the transistor elements U00 through U59 are divided. By controlling the rise time of the enabling pulse successively provided to each of the "tens" groups of transistor elements comprising the scanner 100 and by providing that the quiescent voltage level be maintained at each of the monitoring points M00 through M59 during each sampling thereof, the effect of such reflected noise pulses appearing along an energization communication connection is minimized and rendered inaudible whereby no annoyance is caused to a particular one of the substations S00 through S59 being served therealong.

It is to be understood that the above-described embodiment is illustrative only of one of numerous applications of the principles of my invention and that numerous other embodiments may be devised by those skilled in the art without departing from the spirit and scope thereof.

What is claimed is:

1. A gating circuit comprising a transistor element having an emitter, collector and base electrode, a first voltage source for providing a quiescent voltage level at said collector electrode, first resistance means connecting said first source to said collector electrode, a second voltage source, second resistance means connecting said second source to said emitter electrode, control means for enabling said transistor element, third resistance means connecting said control means to said base electrode, said second resistance means being of greater magnitude than said first resistance means to substantially maintain the voltage level provided by said first source to said collector electrode during the initial operation of said enabling means, said third resistance means being of such magnitude with respect to said second resistance means to determine a voltage level at said emitter electrode during an enabled operation of said transistor element equal to said quiescent voltage level.

2. A gating circuit comprising a transistor element having an emitter, collector and base electrode, biasing means for normally maintaining said transistor element in a nonconductive state, means for providing a predetermined amount of energy to the base electrode of said transistor element to allow conduction only through the emitter-base junction of said transistor element, said biasing means and said providing means being cooperative to maintain an equal voltage level at said emitter and said collector electrode whereby the collector-base junction of said transistor element is provided a forward-biasing potential, and means connecting said collector electrode to a terminal point at which appears a detectable condition, said detectable condition being sufficient to unbalance said equal voltage level whereby conduction through the emitter-collector circuit of said transistor element is initiated.

3. A scanner network for selectively sampling on a time basis a plurality of monitoring points each appearing along an energizable communication connection comprising a plurality of transistor elements each having an input electrode, an output electrode and a control electrode, said input electrode of each of said transistor elements being electrically integral with one of said monitoring points, a first voltage source multipled to each of said monitoring points through one of a plurality of first impedance elements for providing a quiescent voltage level thereat, a second voltage source multipled to each of said output electrodes of said plurality of transistor elements through one of a plurality of second impedance elements, control means for selectively enabling selected ones of said plurality of transistor elements, said control means being connected to each of said control electrodes through one of a plurality of third impedance elements, each of said second impedance elements being of such magnitude with respect to each of said first impedance elements as to render transient turn-on pulses developed upon an enabling of said selected ones of said plurality of transistor elements subaudible along said communication connections to which the input electrodes thereof are electrically integral, each of said third impedance elements being of such magnitude with respect to each of said second impedance elements as to determine the voltage at said output electrodes of said selected ones of said plurality of transistor elements at the quiescent voltage level provided to said monitoring points to which the input electrodes thereof are electrically integral.

4. In combination, a plurality of monitoring points at which may appear a detectable condition, means for maintaining each of said plurality of monitoring points at a quiescent voltage level, means responsive to said detectable condition, scanner means having a plurality of energizable channels connecting each of said monitoring points to said responsive means, each channel including at least one transistor element having an emitter, collector and base electrode arranged in each of said channels and so adapted as to have the emitter-collector circuit serially arranged therealong, means for normally biasing each of said transistor elements in a nonconductive condition, and means connected to the base electrodes of said transistor elements in each of said channels for controlling said transistor elements to selectively energize one of said channels, said control means being operative to provide a saturated operation for said transistor element arranged in said energized channel, said biasing means being responsive to a saturated operation of said transistor element to determine the voltage level at said emitter and collector electrodes thereof at said quiescent voltage level whereby current flow along said energized channel is inhibited, the appearance of said detectable condition at said one monitoring point connected to said energized channel being operative to further bias said transistor element arranged therein to initiate current flow through said emitter-collector circuit thereof whereby current flow along said energized channel is attained.

5. A scanning network for selectively connecting a plurality of monitoring points to a common point comprising a plurality of first transistor elements and a plurality of second transistor elements each having an emitter, base and collector electrode, said collector electrode of each of said plurality of first transistor elements being connected to one of said monitoring points, means for multipling selected groups of said emitter electrode of said plurality of first transistor elements one to each of said collector electrodes of said plurality of second transistor elements, means for individually biasing said collector electrodes of each plurality of first transistor elements to provide a quiescent voltage level at said monitoring point connected thereto, biasing means including individual impedance means for each of said groups of multipled emitter electrodes and said collector electrode electrically integral therewith, first means for selectively providing a predetermined amount of energy to said base electrode of one of said plurality of first transistor elements in each of said groups such as to provide a resultant voltage drop across each of said individual impedance means to cause the voltage at said multipled emitter electrodes to be equal to said quiescent voltage level, biasing means including a common impedance means multipled to said emitter electrodes of each of said plurality of second transistor elements, second means for selectively providing a predetermined amount of energy to said base electrode of one of said additional transistors to provide a resultant voltage drop across said common impedance means to cause the voltage at said second transistor emitter electrode to be equal to said quiescent voltage level, and means connecting said multipled emitter electrodes of said plurality of second transistor elements to said common point.

6. A scanning network as set forth in claim 5 of transistor elements are of the same conductivity type and wherein said individual impedance means and said common impedance means are of equal magnitude.

7. A scanner network for selectively connecting one of a plurality of monitoring points to a common point, each of said monitoring points being maintained at a same quiescent voltage level, comprising a plurality of first transistor elements and a plurality of second transistor elements, each of said plurality of second transistor elements having an emitter-collector circuit multipled to and tandemly arranged with the emitter-collector circuits of a selected group of said plurality of first transistor elements, means for multipling the emitter-collector circuits of each of said plurality of second transistor elements to said common point whereby a plurality of channels are provided each connecting one of said monitoring points and said common point, first biasing means including a plurality of first common load means each connected to said multipled emitter-collector circuits in each of said selected groups, second biasing means including a second common load means connected to said multipled emitter-collector circuits of said second plurality of transistors, and means for selectively energizing a channel through said scanner network, said energizing means including a first counter means having a plurality of bistable stages each connected to the base electrode of one of said plurality of first transistor elements in each of said selected groups; a second counter means having a plurality of bistable stages each connected to one of said plurality of second transistor elements, each of said bistable stages in said first counter means being operative to provide sufficient current through said base electrodes connected thereto to determine a voltage at the junction at each of said plurality of first common load means with said plurality of multipled emitter-collector circuits equal to said quiescent voltage level, each of said bistable stages in said second counter means being operative to provide sufficient current through said base electrode connected thereto to determine a voltage at the junction of said second common load means with said plurality of multipled emitter-collector circuits equal to said quiescent voltage level whereby a zero voltage drop is provided along said energized channel.

8. A bidirectional selector circuit for connecting a first terminal individually to any of a plurality of second terminals comprising a first and a second group of transistors, there being fewer second group transistors than first group transistors, means interconnecting said transistors to define a unique series of connection between said first terminal and each of said second terminals, said series connection including the emitter-collector circuits of one of said first group and one of said second group transistors, means for applying bias potentials to said first and second terminals and the interconnection between said first and second group transistors to establish a substantially zero voltage drop through the selector circuit on energizing of any of said series connections between a second terminal and said first terminal, said bias potential means including a first bias source, first resistance means connecting said second terminals to said first source, a second bias source, second resistance means connecting said second source to said interconnections between said first and second group transistors, said second resistance mean being substantially larger than said first resistance means and said second source being larger than said first source whereby said interconnection assumes substantially the potential of said first source on enablement of one of said first group transistors, a third bias source substantially equal to said second bias source, and third resistance means connecting said third bias source to said first terminal whereby said first terminal assumes substantially the potential of said second terminal on the enablement of one of said second group of transistors, and high impedance means for applying enabling pulses to one of said first and said second transistor bases for enabling one of said unique series connection between one of said second terminals and said first terminal.

References Cited in the file of this patent

UNITED STATES PATENTS

| | | |
|---|---|---|
| 2,627,039 | MacWilliams | Jan. 27, 1953 |
| 2,863,001 | Trousdale | Dec. 2, 1958 |
| 2,868,881 | Trousdale | Jan. 13, 1959 |
| 2,891,171 | Shockley | June 16, 1959 |
| 2,901,640 | Steinman | Aug. 25, 1959 |
| 2,921,140 | Abbott | Jan. 12, 1960 |